(12) United States Patent
Kazi et al.

(10) Patent No.: US 10,884,671 B2
(45) Date of Patent: Jan. 5, 2021

(54) COGNITIVE OPTIMIZATION OF A MULTI-PART OBJECT

(71) Applicant: International Business Machines Corporation, Armonk, NY (US)

(72) Inventors: Asimuddin Kazi, Naperville, IL (US); Jason Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 15/825,254

(22) Filed: Nov. 29, 2017

(65) Prior Publication Data

US 2019/0163406 A1 May 30, 2019

(51) Int. Cl.
*G06F 3/06* (2006.01)
*H04L 29/08* (2006.01)

(52) U.S. Cl.
CPC ............ *G06F 3/0667* (2013.01); *G06F 3/064* (2013.01); *G06F 3/067* (2013.01); *H04L 67/1097* (2013.01)

(58) Field of Classification Search
CPC ........ G06F 17/30; G06F 3/0667; G06F 3/067; G06F 3/064; H04L 67/1097
USPC ........................................ 707/821
See application file for complete search history.

(56) References Cited

U.S. PATENT DOCUMENTS

| | | | |
|---|---|---|---|
| 7,293,133 B1* | 11/2007 | Colgrove | G06F 3/0608 711/111 |
| 8,099,758 B2* | 1/2012 | Schaefer | H04L 63/0428 726/1 |
| 2002/0133491 A1* | 9/2002 | Sim | H04L 67/1008 |
| 2006/0031266 A1* | 2/2006 | Colbeck | G06F 16/1844 |
| 2006/0167922 A1 | 7/2006 | Poyourow | |
| 2010/0332454 A1* | 12/2010 | Prahlad | G06F 3/0649 707/654 |
| 2011/0161680 A1* | 6/2011 | Grube | G06F 21/64 713/193 |
| 2013/0104185 A1* | 4/2013 | Smith | H04L 63/1408 726/1 |
| 2014/0380064 A1 | 12/2014 | Resch | |
| 2016/0357778 A1* | 12/2016 | MacKenzie | G06F 13/36 |
| 2017/0091033 A1 | 3/2017 | Leggette | |

* cited by examiner

*Primary Examiner* — Kuen S Lu
(74) *Attorney, Agent, or Firm* — Edward J. Wixted, III (57) ABSTRACT

Aspects of the present invention disclose a method, computer program product, and system for managing a multi-part object. The method includes one or more processors determining information relevant to generating a multi-part object. The method further includes one or more processors determining a size for the multi-part object based upon an analysis of the determined information. The method further includes one or more processors generating the multi-part object. The method further includes one or more processors responsive to determining that a component of the multi-part object does not adhere to a user-defined policy, modifying the multi-part object based on the user-defined policy.

20 Claims, 3 Drawing Sheets

COGNITIVE OPTIMIZATION OF A MULTI-PART OBJECT

BACKGROUND

The present invention relates generally to the field of computer networks, and more particularly to data storage networks.

Network-attached storage (NAS) is mass storage attached to a computer which another computer can access at file level over a local area network, a private wide area network, or in the case of online file storage, over the Internet. NAS is commonly associated with the NFS and CIFS/SMB protocols.

Storage area network (SAN) is a specialized network that provides other computers with storage capacity. The crucial difference between NAS and SAN is that NAS presents and manages file systems to client computers, while SAN provides access at block-addressing (raw) level, leaving it to attaching systems to manage data or file systems within the provided capacity. SAN is commonly associated with Fibre Channel networks.

A storage area network (SAN) is a network which provides access to consolidated, block level data storage. SANs are primarily used to enhance storage devices, such as disk arrays, tape libraries, and optical jukeboxes, accessible to servers so that the devices appear to the operating system as locally attached devices.

A SAN typically has its own network of storage devices that are generally not accessible through the local area network (LAN) by other devices. The cost and complexity of SANs dropped in the early 2000s to levels allowing wider adoption across both enterprise and small to medium-sized business environments. A SAN does not provide file abstraction, only block-level operations.

SUMMARY

According to one embodiment of the present invention, a method for managing a multi-part object is provided. The method includes one or more processors determining information relevant to generating a multi-part object. The method further includes one or more processors determining a size for the multi-part object based upon an analysis of the determined information. The method further includes one or more processors generating the multi-part object. The method further includes one or more processors responsive to determining that a component of the multi-part object does not adhere to a user-defined policy, modifying the multi-part object based on the user-defined policy.

DETAILED DESCRIPTION

Embodiments of the present invention recognize that many considerations must be balanced to maximize the efficiency of a multi-part object. Embodiments of the present invention also recognize that there are different use cases for multi-part objects, such as a rarely modified multi-part object as compared to a frequently updated multi-part object.

Embodiments of the present invention recognize that current approaches to modify multi-part objects waste resources in rewriting a new part for the multi-part object when the size of the data modification is small relative to the part size. Multi-part objects are items that are addressable by a single name, yet composed of sub-objects or sub parts that can be considered an object. The individual objects that make up the multi-part object are immutable, but the multi-part object can be modified by changing the individual set of objects that compose the multi-part object. For example, by adding new parts to the end of the multi-part object, the multi-part object can be extended or increased in size by adding new individual objects.

Embodiments of the present invention provide a method that achieves superior efficiency for the different use cases through a processing unit that dynamically chooses an optimal part size to use when composing or creating a multi-part object. Embodiments of the present invention provides a processing unit that makes part size optimization decisions by incorporating a plurality of information.

Figure 1:
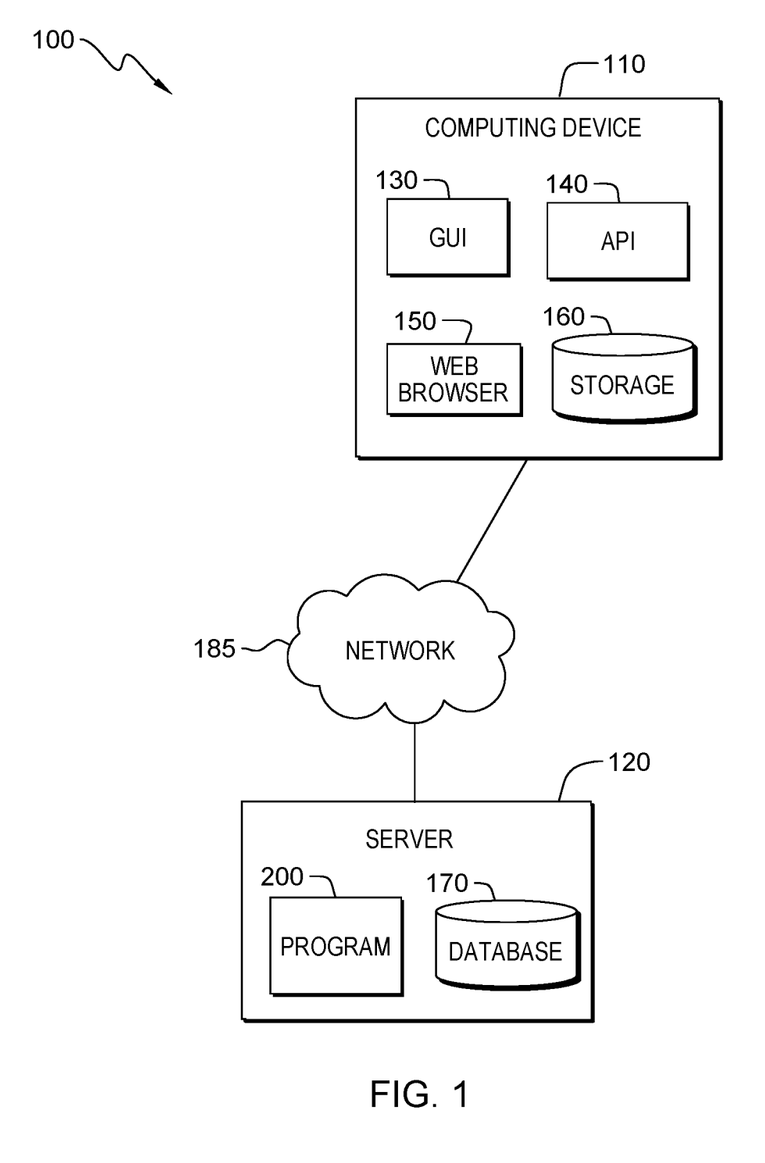
FIG. 1 is a functional block diagram illustrating a distributed data processing environment, in accordance with an embodiment of the present invention.

Example embodiments, in accordance with the present invention, will now be described in detail with reference to the Figures. FIG. 1 is a functional block diagram, illustrating distributed data processing environment 100. Distributed data processing environment 100 includes computing device 110, server 120, interconnected over network 185.

In one embodiment, computing device 110 includes graphical user interface (GUI) 130, application programming interface 140 (API), web browser 150, and storage 160. The various programs on computing device 110 include a web browser, an electronic mail client, security software (e.g., a firewall program, a geo-locating program, an encryption program, etc.), an instant messaging (IM) application (app), and a communication (e.g., phone) application.

Computing device 110 may be a desktop computer, a laptop computer, a tablet computer, a specialized computer server, a smartphone, a wearable device (e.g., smart watch, personal fitness device, personal safety device), or any programmable computer system known in the art with an interactive display or any other computer system known in the art. In certain embodiments, computing device 110 represents a computer system utilizing clustered computers and components that act as a single pool of seamless resources when accessed through network 185, as is common in data centers and with cloud-computing applications. In general, computing device 110 is representative of any programmable electronic device or combination of programmable electronic devices capable of executing machine-readable program instructions and communicating with other computer devices via a network.

In one embodiment, graphical user interface 130 operates on computing device 110. In another embodiment, graphical user interface 130 operates on another computer in a server based setting, for example on a server computer (e.g., server 120). In yet another embodiment, graphical user interface 130 operates on computing device 110 simultaneously with a server computer interconnected through network 185 (e.g., server 120). Graphical user interface 130 may be any user interface used to access information from computing device 110, such as information gathered or produced by program 200. Additionally, graphical user interface 130 may be any user interface used to supply information to computing device 110, such as information supplied by a user to be used by program 200. In some embodiments, graphical user interface 130 may present a generic web browser used to retrieve, present, and negotiate resources from the Internet. In other embodiments, graphical user interface 130 may be a software or application that enables a user at computing device 110 access to network 185.

In yet another embodiment, a user of computing device 110 can interact with graphical user interface 130 through a touch screen that performs as both an input device to a graphical user interface (GUI) and as an output device (i.e., an electronic display) presenting a plurality of icons associated with software applications or images depicting the executing software application. Optionally, a software application (e.g., a web browser) can generate graphical user interface 130 operating within the GUI of computing device 110. Graphical user interface 130 accepts input from a plurality of input/output (I/O) devices including, but not limited to, a tactile sensor interface (e.g., a touch screen or a touchpad) referred to as a multi-touch display. An I/O device interfacing with graphical user interface 130 may be connected to computing device 110, which may operate utilizing wired (e.g., USB port) or wireless network communications (e.g., infrared, NFC, etc.). Computing device 110 may include components, as depicted and described in further detail with respect to FIG. 3, in accordance with embodiments of the present invention.

Application programming interface 140 (API) specifies how software components should interact with each other. In an embodiment, API 140 enables a user to upload multi-part objects into parts or make a copy of an existing multi-part object. In one embodiment, API 140 is specific to a given technology. In an example, a user can retrieve an entire multi-part object or a portion of a multi-part object. In this example, a user can retrieve a sub-resource associated with a multi-part object and update the sub-resource where applicable or make a copy of the sub-resource associated with the multi-part object. When client devices and servers interact, the client devices and servers rely on pre-determined versions of API 140 on the client application side and compatible API method versions in the API library on the server side. In this example, the API versions of API 140 are modified when changes are made on the server side.

Web browser 150 may be a generic web browser used to retrieve, present, and traverse information resources from the Internet. In some embodiments, web browser 150 may be a web browser designed for a mobile device. In other embodiments, web browser 150 may be a web browser designed for a traditional computing device, such as a desktop computer, PC, or laptop. In general, web browser 150 may be any application or software that enables a user of computing device 110 to access a webpage over network 185. In the depicted environment, web browser 150 resides on computing device 110. In other embodiments, web browser 150, or similar web browsers, may reside on other computing devices capable of accessing a webpage over network 185.

Storage 160 (e.g., a database) located on computing device 110, represents any type of storage device capable of storing data that is accessed and utilized by computing device 110. In other embodiments, storage 160 represents multiple storage devices within computing device 110. Storage 160 stores information such as, but not limited to, current part size for a multi-part object accessed through web browser 150, a history of part modifications for a given object, and a history of part modifications by the requester for a present multi-part object. In an example, storage 160 stores information of past resource efficiency calculations for multi-part modifications. In this example, if a part of a multi-part object, at five-hundred megabytes is modified to the multi-part object and effects five megabytes, then the resulting new five-hundred-megabyte part containing the modification would need to be written to reflect the change. In this example, the resource efficiency for the modification would be one percent. In another example, if the part size modified relative to the entire multi-part object was ten megabytes then the modification would be fifty-percent efficient.

In general, network 185 can be any combination of connections and protocols that will support communications among computing device 110. Network 185 can include, for example, a local area network (LAN), a wide area network (WAN), such as the Internet, a cellular network, or any combination of the preceding, and can further include wired, wireless, and/or fiber optic connections.

Server 120 may be a desktop computer, a laptop computer, a tablet computer, a specialized computer server, a smartphone, or any other computer system known in the art. In certain embodiments, server 120 represents a computer system utilizing clustered computers and components that act as a single pool of seamless resources when accessed through network 185, as is common in data centers and with cloud-computing applications. In general, server 120 is representative of any programmable electronic device or combination of programmable electronic devices capable of executing machine-readable program instructions and communicating with other computer devices via a network. In one embodiment, server 120 includes database 170 and program 200.

In an embodiment, server 120 is capable of initiating a handshake process between server 120 and computing device 110. Handshaking is an automated process of negotiation that dynamically sets parameters of a communications channel established between two entities before normal communication over the channel begins. Handshaking follows the physical establishment of the channel and precedes normal information transfer. Handshaking facilitates connecting heterogeneous computing systems, or equipment, over a communication channel without the need for user intervention to set parameters. In an example, server 120 initiates the handshake process by sending a message to computing device 110 indicating that server 120 wants to establish a communication channel in order to gain access to programs on computing device 110.

Database 170 may be a repository that may be read by program 200. In an example embodiment, database 170 can include information, such as a part size policy for a vault, container, or requester. The data stored to database 170 may be changed or updated by data input by a user, such as a user with access to server 120. In one embodiment, database 170 resides on server 120. In other embodiments, database 170 may reside on another server, another computing device, or mobile device, provided that database 170 is accessible to program 200. Database 170 operates to enhance program 200 by increasing the accuracy or amount of data available to program 200. Database 170 stores keyword data of typical language between one or more users that would indicate a telephone call, video conference, or live conversation between one or more users.

Figure 2:
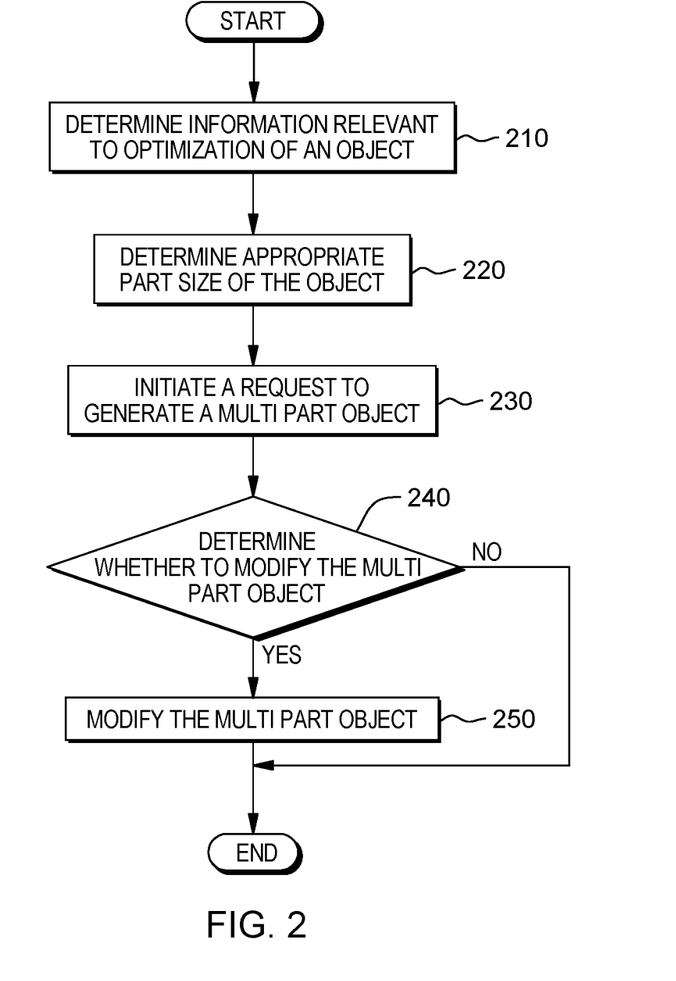
FIG. 2 is a flowchart depicting operational steps of program 200, a program for dynamically choosing an optimal part size when creating a multi-part object, in accordance with an embodiment of the present invention.

FIG. 2 is a flowchart depicting operational steps of program 200, a program for dynamically choosing an optimal part size when creating a multi-part object, in accordance with an embodiment of the present invention.

In step 210, program 200 determines information relevant to optimization of an object. In an embodiment, program 200 determines the object optimization by analyzing information from one or more sources, such as a cloud-based data processing service, an open source cluster computing framework, or a genomic sequencing database. In an example, program 200 analyzes current individual part size information, a history of modifications for the object, the size of the modifications if the parts were modified, and total number of parts necessary to represent a typical multi-part object to determine information relevant to optimizing a multi-part object. In this example, program 200 analyzes, information from storage 160, the total number of parts necessary to represent a typical multi-part object to determine that the information is relevant in optimizing a multi-part object.

In another embodiment, program 200 analyzes a part size policy, from database 170, for the container to determine that the information is relevant to optimization. In an example, program 200 determines that the container, a folder in this example, is only capable of receiving uploads between five megabytes and five terabytes. In this example, program 200 analyzes the size policy for the folder, located in database 170 according to a policy, to determine that any upload into the folder must be done in a multi-part upload. In another example, program 200 analyzes a policy on an additional folder. Program 200 determines that based upon the policy of the container, program 200 can upload an object to the additional folder in a single operation up to five gigabytes.

In step 220, program 200 determines the appropriate part size of the object. In an embodiment, program 200 uses the information derived from step 210 to determine what part size to use. In an example, program 200 determines the object part sizes are no longer suitable for uploading because the container policy has changed. In this example, program 200 increases the object part size by coalescing multiple object parts into a larger region of the object.

In another example, program 200 determines the object, generated in step 210, part size is too large as a result of change in the container policy. Program 200 decomposes at least one part of the object into a set of smaller parts by reading the part and writing out new parts. Program 200 creates a part of decomposed parts of the larger object that are currently equal to the larger object from which the parts were decomposed. In this example, program 200 may remove the original larger object if the data on the large object is no longer used or relevant. In step 230, program 200 initiates a request to generate a multi-part object. In an embodiment, program 200 initiates a request, utilizing information from step 220, to generate a multi-part object.

Program 200 utilizes Information Dispersal Algorithms (IDAs) to reverse engineer a multi-part object from immutable individual objects of data. IDA transforms individual objects of data into slices of data by using equations such that a subset of the data slices can be used to recreate the original data. Slices are created by using a combination of erasure coding and encryption. Information dispersal algorithms use erasure codes as a means to create redundancy for transferring and storing data. An erasure code is a forward error correction (FEC) code that transforms a message of k symbols into a longer message with n symbols such that the original message can be recovered from a subset of the n symbols (k symbols). Erasure codes use advanced algorithms to create "extra data" that allows a user to need only a subset of the data to recreate it.

In an example, program 200 initiates a request to upload a multi-part object. In this example, program 200 initiates the upload, utilizing API 140 to upload large objects, by assembling previously uploaded parts. Program 200 uploads a single object as a set of parts. Program 200 links all the individual object parts, each part is a contiguous portion of the object's data, in an ascending order to generate the initial object.

In another example, program 200, from step 210, analyzes a series of individual representative samples of genomic objects from a genomic sequencing and recreates a multi-part object of the entire genomic sequence from combining the simple examples of individual sequences on the genomic database that contain a single short genomic sequence. The single sequence contains less than 10,000 individual genomic sequences. Utilizing forward error correction, program 200 initiates a request to aggregate the individual samples of genomic objects.

In decision step 240, program 200 determines whether to modify the multi-part object. In decision step 240 ("no" branch), program 200 analyzes a history of multi-part object genomic sequence sizes, on database 170, and determines that the current size of the multi-part object genomic sequence is consistent with part size policy of the requester of the multi-part object genomic sequence. Program 200 does not modify the multi-part object genomic sequence because the requester downloading the multi-part object genomic sequence has a size policy, as determined by analyzing a history of downloads of multi-part object genomic sequences with the requester, indicates is consistent with the size of the current multi-part object genomic sequence.

In an embodiment, program 200 analyzes a history of part modifications for a given multi-part object, and the estimated size of the modification of the final modified multi-part object when the individual parts of the multi-part object are modified to determine whether to modify a multi-part object. In an example, program 200 determined, in step 220, the appropriate part size of the multi-part genomic data object. In this example, program 200 determines that program 200 will modify the multi-part genomic data object because program 200 analyzes a history of modification of genomic data, on database 170, and determines that the size of data that must be stored for a single genome is 30 times larger than the size of the genome itself to make up for errors incurred during sequencing and preliminary analysis. Program 200 retrieves a history of part modifications for genomic sequences in database 170 and determines that the size of a typical multi-part genomic data object is between two to forty exabytes (1 exabyte is $10^{18}$ bytes).

In step 250, program 200 modifies the multi-part object. In response to determining that program 200 will modify the multi-part object (decision step 240, "yes" branch). In an example, program 200, having determined 2-40 exabytes is too large for a network, decomposes the multi-part object genomic sequence by breaking the multi-part object genomic sequence into ten parts. In this example, program 200 analyzes the individual decomposed genomic sequence objects by reading each individual object and generating a new set of individual objects. The new set of individual objects of the genomic sequence are generated to be modified to require less data and space on a network. The new data objects, when concatenated, are equal to the multi-part object genomic sequence but in a more efficient, and less space consuming configuration. In this example, the pre modified multi-part object genomic sequence was forty exabytes. Program 200 modified the individual objects of the genomic sequence to equal up to less than 1 exabyte in totality.

Figure 3:
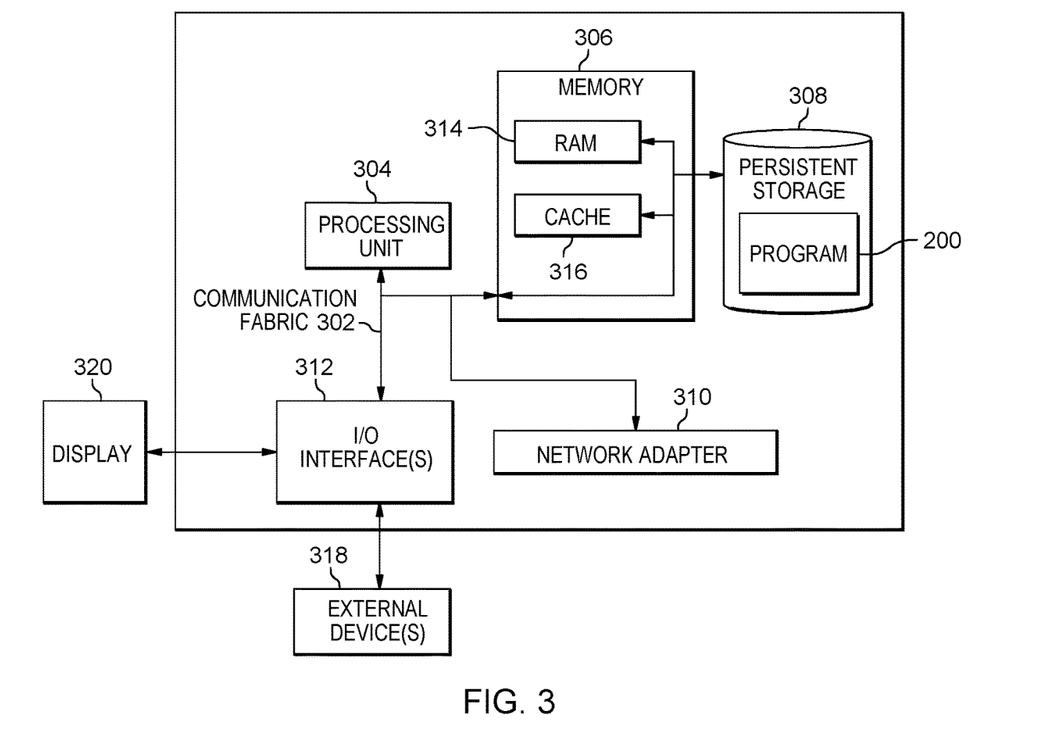
FIG. 3 is a block diagram of components of a computer system, such as the server computer of FIG. 1, in an embodiment, in accordance with the present invention.

FIG. 3 depicts a block diagram of components of server 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 120 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Program 200 may be stored in persistent storage 308 and in memory 306 for execution by one or more of the respective computer processors 304 via cache 306. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Program 200 may be downloaded to persistent storage 308 through communications unit 310.

I/O interface(s) 312 allows for input and output of data with other devices that may be connected to server computer 120. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., cognitive bespoke program 200, can be stored on such portable computer readable storage media and can be loaded onto persistent storage 308 via I/O interface(s) 312. I/O interface(s) 312 also connect to a display 320. Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing a multi-part object, the method comprising:
    determining, by one or more processors, information with respect to an existing multi-part object, to generate determined information;
    determining, by one or more processors, a size for a new multi-part object based upon an analysis of the determined information;
    generating, by one or more processors, the new multi-part object, based on the determined information;
    responsive to determining that a component of the new multi-part object does not adhere to a user-defined policy, modifying, by one or more processors, the new multi-part object based on the user-defined policy; and
    sending the new multi-part object to an information dispersal algorithm.

2. The method of claim 1, further comprising:
    responsive to determining that a set of components of the new multi-part object does adhere to the user-defined policy, initiating, by one or more processors, an action utilizing the new multi-part object.

3. The method of claim 1, further comprising:
    responsive to determining that one or more components of the new multi-part object does not adhere to a user-defined policy, decomposing, by one or more processors, the one or more components of the new multi-part object.

4. The method of claim 3, wherein decomposing the one or more components of the new multi-part object further comprises:
    determining, by one or more processors, an arrangement of the one or more components of the new multi-part object that reduces the size of the new multi-part object; and
    modifying, by one or processors, the one or more components of the new multi-part object based on the determined arrangement of the one or more components of the new multi-part object.

5. The method of claim 1, wherein determining a size for the new multi-part object based upon the analysis of the determined information further comprises:
    responsive to determining that a size policy of the user has changed, determining, by one or more processors, an update to the size policy of the user by analyzing a policy database.

6. The method of claim 1 wherein, generating the new multi-part object further comprises:
    identifying, by one or more processors, a plurality of individual components of the new multi-part object;
    determining, by one or more processors, information with respect to the individual components of the new multi-part object, wherein the information includes contiguous portions of a data of the individual components; and aggregating, by one or more processors, the data of the individual components to create a representative sample of the new multi-part object.

7. The method of claim 1 wherein the determined information relevant to generating the new multi-part object is based on aspects of the existing multi-part object selected from the group consisting of:
a part size, a history of modifications, a size of modifications, and a total number of components of the existing multi-part object.

8. A computer program product for managing a multi-part object, the computer program product comprising:
one or more computer readable tangible storage media and program instructions stored on at least one of the one or more computer readable storage media, the program instructions readable/executable by one or more computer processors and further comprising:
program instructions to determine information with respect to an existing multi-part object, to generate determined information;
program instructions to determine a size for a new multi-part object based upon an analysis of the determined information;
program instructions to generate the new multi-part object, based on the determined information;
program instructions to responsive to determining that a component of the new multi-part object does not adhere to a user-defined policy, modify the new multi-part object based on the user-defined policy; and
program instructions to send the new multi-part object to an information dispersal algorithm.

9. The computer program of claim 8, further comprising program instructions, stored on the one or more computer readable storage media, which when executed by a processor, cause the processor to:
responsive to determining that a set of components of the new multi-part object does adhere to the user-defined policy, initiate an action utilizing the new multi-part object.

10. The computer program of claim 8, further comprising program instructions, stored on the one or more computer readable storage media, which when executed by a processor, cause the processor to:
responsive to determining that one or more components of the new multi-part object does not adhere to a user-defined policy, decompose the one or more components of the new multi-part object.

11. The computer program of claim 10, wherein the program instructions to decompose the one or more components of the new multi-part object further comprises program instructions, stored on the one or more computer readable storage media, which when executed by a processor, cause the processor to:
determine an arrangement of the one or more components of the new multi-part object that reduces the size of the new multi-part object; and
modify the one or more components of the new multi-part object based on the determined arrangement of the one or more components of the new multi-part object.

12. The computer program of claim 8, wherein the program instructions to determine a size for the new multi-part object based upon the analysis of the determined information further comprises:
responsive to determining that a size policy of the user has changed, determine an update to the size policy of the user by analyzing a policy database.

13. The computer program of claim 8, further comprising program instructions, stored on the one or more computer readable storage media, which when executed by a processor, cause the processor to:
identify a plurality of individual components of the new multi-part object;
determine information with respect to the individual components of the new multi-part object, wherein the information includes contiguous portions of a data of the individual components; and
aggregate the data of the individual components to create a representative sample of the new multi-part object.

14. The computer program of claim 8, wherein the determined information relevant to generating the new multi-part object is based on aspects of the existing, multi-part object selected from the group consisting of:
a part size, a history of modifications, a size of modifications, and a total number of components of the existing multi-part object.

15. A computer system for managing a multi-part object, the computer system comprising:
one or more computer processors;
one or more computer readable storage media; and
program instructions stored on the one or more computer readable storage media for execution by at least one of the one or more computer processors, the program instructions comprising:
program instructions to determine information with respect to an existing multi-part object, to generate determined information;
program instructions to determine a size for a new multi-part object based upon an analysis of the determined information;
program instructions to generate the new multi-part object, based on the determined information;
program instructions to responsive to determining that a component of the new multi-part object does not adhere to a user-defined policy, modify the new multi-part object based on the user-defined policy; and
program instructions to send the new multi-part object to an information dispersal algorithm.

16. The computer system of claim 15, further comprising program instructions, stored on the one or more computer readable storage media, which when executed by a processor, cause the processor to:
responsive to determining that a set of components of the new multi-part object does adhere to the user-defined policy, initiate an action utilizing the new multi-part object.

17. The computer system of claim 15, further comprising program instructions, stored on the one or more computer readable storage media, which when executed by a processor, cause the processor to:
responsive to determining that one or more components of the new multi-part object does not adhere to a user-defined policy, decompose the one or more components of the new multi-part object.

18. The computer system of claim 17, wherein the program instructions to decompose the one or more components of the new multi-part object further comprises program instructions, stored on the one or more computer readable storage media, which when executed by a processor, cause the processor to:
determine an arrangement of the one or more components of the new multi-part object that reduces the size of the new multi-part object; and modify the one or more components of the new multi-part object based on the determined arrangement of the one or more components of the new multi-part object.

19. The computer system of claim 15, wherein the program instructions to determine a size for the new multi-part object based upon the analysis of the determined information further comprises:

responsive to determining that a size policy of the user has changed, determine an update to the size policy of the user by analyzing a policy database.

20. The computer system of claim 15, further comprising program instructions, stored on the one or more computer readable storage media, which when executed by a processor, cause the processor to:

identify a plurality of individual components of the new multi-part object;

determine information with respect to the individual components of the new multi-part object, wherein the information includes contiguous portions of a data of the individual components; and aggregate the data of the individual components to create a representative sample of the new multi-part object.

* * * * *